May 3, 1938. J. B. HAWLEY 2,116,198
MEANS FOR AND METHOD OF MAKING FIBROUS ARTICLES
Filed Feb. 12, 1934 2 Sheets-Sheet 1
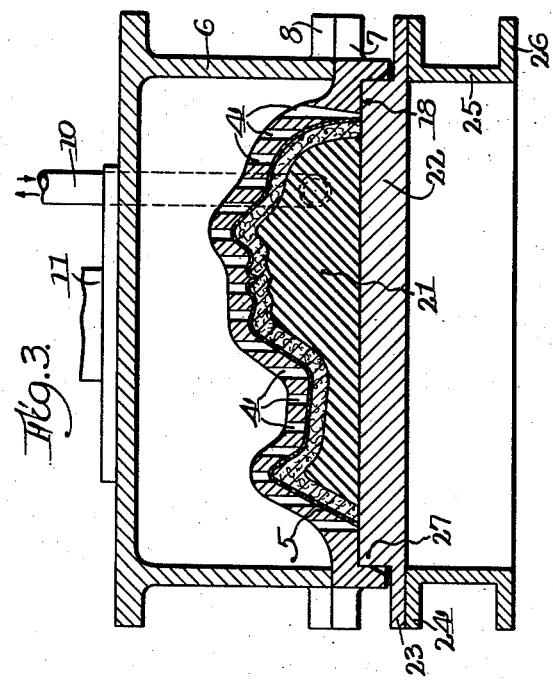
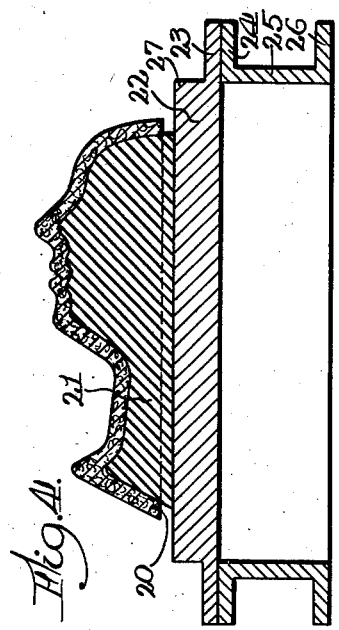
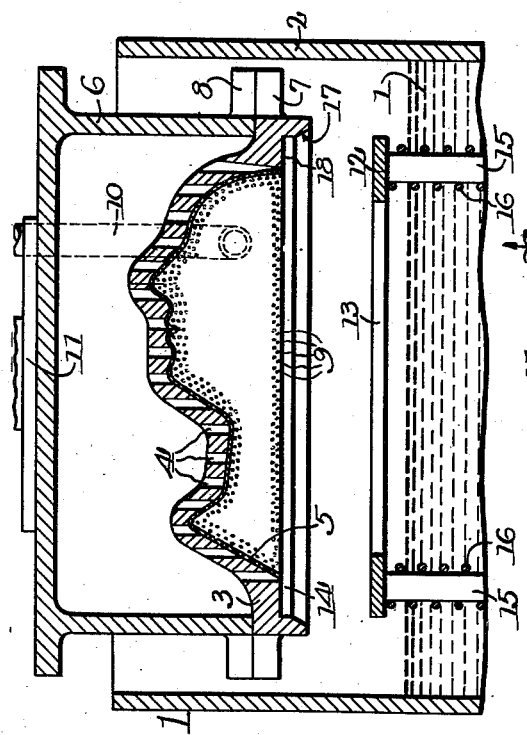
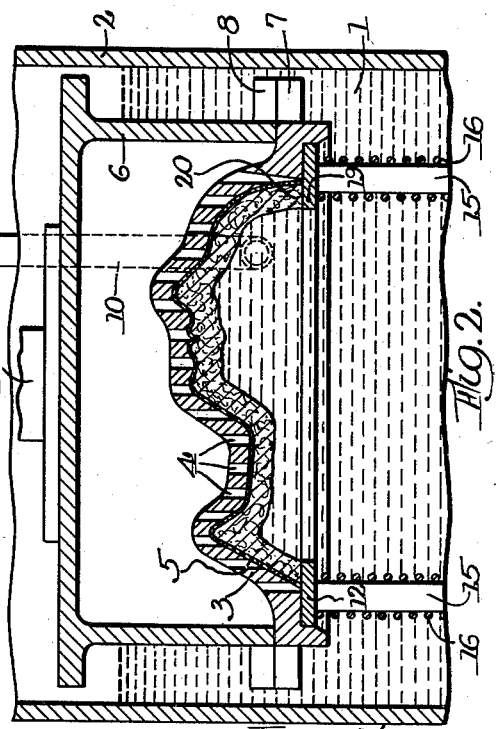
Inventor:
Jesse B. Hawley
By Parkinson & Lane. Atty.

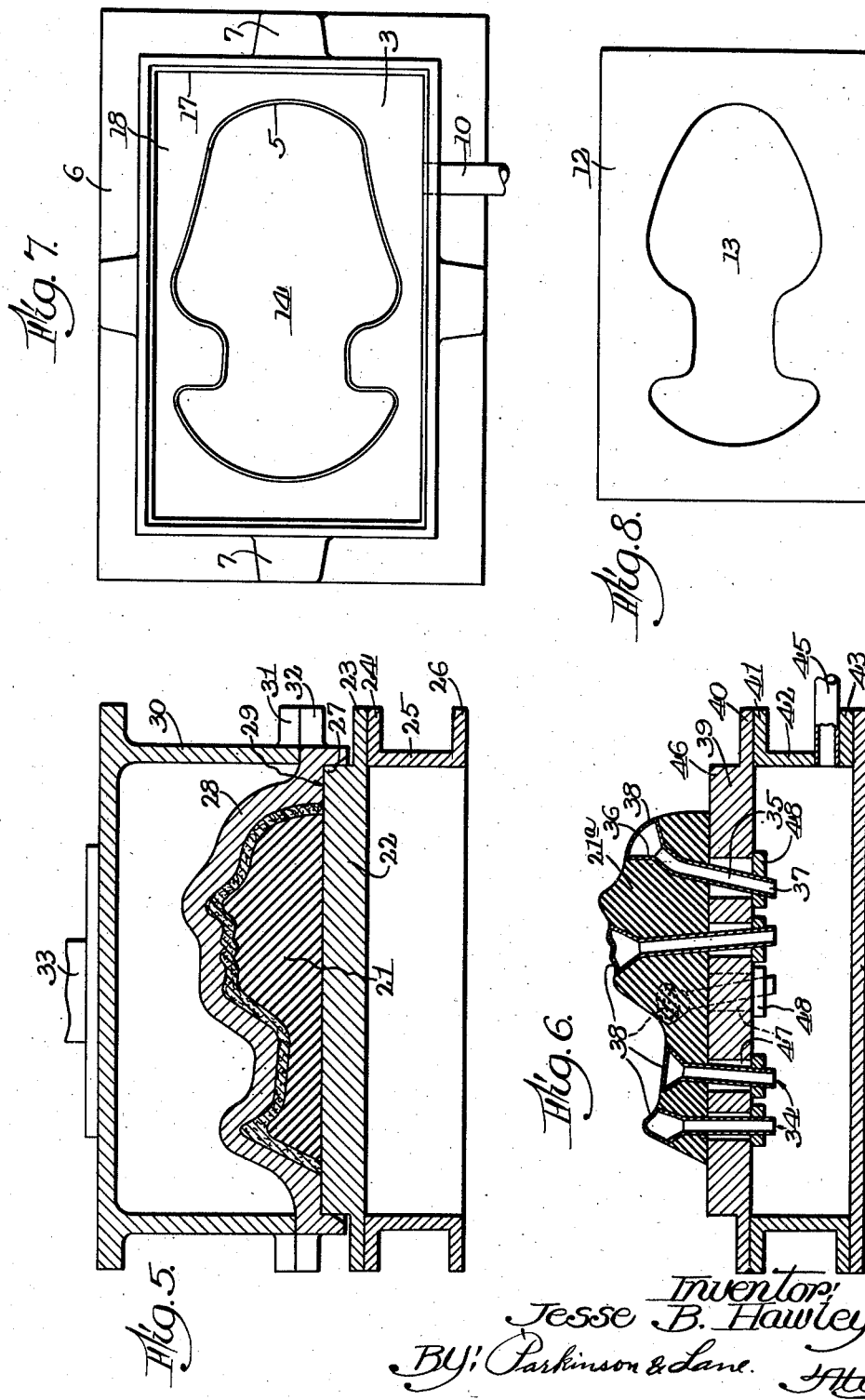
May 3, 1938.  J. B. HAWLEY  2,116,198
MEANS FOR AND METHOD OF MAKING FIBROUS ARTICLES
Filed Feb. 12, 1934    2 Sheets-Sheet 2

Patented May 3, 1938

2,116,198

UNITED STATES PATENT OFFICE 2,116,198

MEANS FOR AND METHOD OF MAKING FIBROUS ARTICLES

Jesse B. Hawley, Geneva, Ill.

Application February 12, 1934, Serial No. 710,855

8 Claims. (Cl. 92—57)

The present invention relates to the art of making or producing fibrous articles and the means therefor.

Among the objects of the invention, is to provide a novel process of producing articles of accreted fibrous material and with a defined contoured surface in accordance with a given or desired effect, by pressing or compressing the accreted article against a molding or defining die, with a pressing die or like member composed of a yielding substance, having resilience or elasticity, such as rubber, gelatine or the like, so that the pressing force or stress will be directed in different directions and so distributed or dispersed as to be imparted or applied in lines normal to the surface of contact between the defining die and the accreted article at the points of contact, or in other words, the pressure is distributed evenly or uniformly over all points of contact. The defining die is preferably rigid and may be made of metal.

If the pressing die were also rigid, the application of pressure by the pressing die would not be the same at all points, the pressure being different on surface portions which are at an angle to the line of force applied to the die than on the surface portions which lie transversely to or at a normal to such line of force.

By using a die composed of yieldable or resilient material, the force applied to it may be distributed or dispersed in different directions throughout the mass of the die, such mass becoming strained or changing in shape to conform to a contoured surface of the accreted article in such a manner as to impart the force in lines at a normal to the surface of contact at the points of contact.

Another object of the invention is to provide a novel process of compressing an accreted fibrous article after the accretion thereof on a contoured surface of a porous former or molding die, with the use of a pressing die of yieldable or elastic material as above described, so as to apply the pressure in dispersed directions for the expelling or extruding of the water or other fluid included in the interstices of the accreted article, thus avoiding the tearing apart of the fibres or otherwise injuring the article, but gaining the advantage of evenly or uniformly compacting the material of the article throughout, so that the fibre structure remains homogeneous.

The invention also comprehends novel means for performing the process disclosed.

Other objects, capabilities, advantages, process steps and features are comprehended by the invention as will hereafter appear and as are inherently possessed by the invention.

Referring to the drawings:

Fig. 1 is a sectional view of an accreting device comprising a porous forming or molding die;

Fig. 2 is a similar view showing an accreted stratum of fibrous material on said forming die or former;

Fig. 3 is a similar view of the forming die and a pressing die with the accreted article compressed therebetween;

Fig. 4 is a similar view showing the stratum removed from the forming die and reposing on the pressing die;

Fig. 5 is a similar view showing the compressing of the stratum between a defining or finishing die and the pressing die;

Fig. 6 is a similar view of a pressing die having draining elements;

Fig. 7 is a bottom plan view of the forming die;

Fig. 8 is a similar view of a plate cooperative with the forming die;

Referring more in detail to the drawings, the invention is effected in connection with means for causing an accretion of fibrous material from a bath 1 of suspended fibres, such as pulp or the like, in water or similar fluid, in a tank or vat 2, and an accreting or forming die comprising a contoured plate 3 having a plurality of holes or apertures 4, a porous and contoured sheet 5, and a suction box or chamber 6, the plate 3 and box 6 having clamping lugs 7 and 8 or the like. The sheet 5 may be of thin metal and provided with a large number of small apertures or pores 9. It may also be of woven wire fabric with fine mesh. This sheet is contoured to determine and define the desired contour of the article to be produced. The inner face or surface of the plate 3 is contoured to fit exactly with the sheet 5, and preferably has a roughened surface or ridges and grooves for the facile draining of water to the holes 4 in the plate 3. At a low point in the chamber or box 6, is connected a pipe or hose 10 leading to a suitable suction or pressure source. The box is secured to and carried by suitable means 11 connected to suitable operating means for lowering and raising the forming die into and out of the vat 2. The pipe 10 is preferably flexible.

In the vat is a felting plate 12 (Figs. 1, 2 and 8) having an opening 13 generally of the same shape as but smaller than the opening 14 in the lower part of the plate 3. This plate is so supported as to be normally above the level of the bath but depressible when the forming die is lowered and submerged in the bath 1. The plate shown by way of illustration, has lugs 15 extending into springs 16 held upright in any suitable manner.

When the forming die is lowered, the plate 12 contacts the guiding surface 17 to direct it to the seat or shoulder 18 formed in the bottom of the plate 3 (Figs. 1 and 2). By reason of the opening 13 being smaller than the opening 14, the plate 12 has a portion 19 inwardly overhanging the shoulder 18 so that the plate portion 19 acts as a backing or support for the edge 20 of the accreted article, otherwise the edge portion of the article would taper or be of incorrect thickness.

The pressing die 21, as shown in Figs. 3, 4, 5 and 6, is composed of yieldable resilient or elastic material, and has a contoured surface to fit the inner contoured surface of the accreted article (Figs. 3, 4 and 5), and is secured or fixed in any suitable manner, as by cementing or vulcanizing, to a plate 22 having flanges 23 connected to flanges 24 of a box 25, the latter having flanges 26 for connection to a suitable movable support adapted to raise and lower the box and die in cooperation with the forming die above described, or the defining or finishing die hereinafter described. The plate 22 has a shoulder 27 so arranged as to fit into and seat against the shoulder part 18 of the forming die (Fig. 3) the guiding surfaces 17 assisting in a proper seating thereof.

A defining or finishing die is shown in Fig. 5, and comprises a contoured plate 28 the inner surface of which has the desired definition to be imparted to the outer contoured surface of the article to be made. This plate has a shoulder 29, against which seats the shoulder 27 of the pressing die plate 22. Connected to the plate is a box 30 in which may be located any suitable heating means, electric or otherwise, for heating the plate 28 when drying and defining the fibrous article. The box 30 and plate 28 have clamping lugs 31 and 32, and the box is secured to and carried by means 33 suitably operated to effect the desired article as later explained.

The pressing die 21ª shown in Fig. 6 is also composed of the same yieldable resilient or elastic material as in the die shown in Figs. 3, 4 and 5, but contains or carries a number of draining element 34 molded or otherwise embedded in the material of die 21ª. Each draining element comprises a duct 35 having an inlet funnel 36 at one end and a protruding outlet end portion 37. The mouth of the funnel is closed by a perforated cap 38 having the contour or shape of the part of the die it replaces.

The yieldable part of the die is secured, as by cementing, vulcanizing or otherwise, to a plate 39 having flanges 40 secured to flanges 41 of a box 42, the latter having flanges 43 to which is secured a plate 44. The box 42 has connected to it a pipe 45 leading to and connected to any suitable source of suction or pressure. The plate 39 has shoulders 46 adapted to fit into a seat upon the shoulder 29 of the defining or finishing die shown in Fig. 5, as well as also the shoulder 18 of the accreting or forming die shown in Figs. 1, 2 and 3.

As the pressing die (Fig. 6) is compressed, the protruding portions 37 of the draining elements will move, and hence the plate 39 is provided with a number of holes 47 of sufficient size to permit a free and unimpeded movement of the duct portions 37, as clearly shown in Fig. 6.

When suction is effective in the box 42 and the draining elements, the latter are held anchored by the funnel parts 36 so that the draining elements will not be drawn through the material 21ª and holes 47. When pressure is effective in the box 42, the draining elements might be blown out, and to prevent this, each duct portion 37 has secured to it a collar or disc 48 of sufficient size to close the hole 47 and overlap the adjacent part of the plate 39, thus anchoring the draining elements against outward movement when the pressure is on in the box 42. When the die is compressed, the portions 37 of the ducts move downwardly in the holes 47 and the discs 48 move away from the plate 39. When the die is restored to its normal or uncompressed condition, the duct portions 37 and the discs move upwardly to the positions shown in Fig. 6.

The mode of procedure is as follows: Referring first to Figs. 1 to 8 inclusive, the accreting or forming die 3—6, while having a suction effective therein, is lowered into the bath 2 until it engages with the plate 12 so that the latter will seat against the shoulder 18, and the two are then further lowered to be submerged in the bath 1 as shown in Fig. 2. The suction in the box 6 will cause a flow of water through the interstices of the sheet 5 and the holes 4 of the plate 3, the water being drawn out through the pipe 10. During this action, the fibres of the bath are accreted and integrated upon the inner surface of the sheet 5 to form a stratum of given or desired thickness. The plate portion 19 will act to support the edge of the stratum or blank so that it will have proper thickness.

After accreting a sufficient thickness of fibrous material, and with the suction still continuing, the former is raised out of the bath. As the plate 12 reaches the position shown in Fig. 1, the former 3—5 disengages from it and leaves the plate ready for the next operation. The forming die is raised sufficiently high above the top of the vat so as to provide a space beneath it where the pressing die may be moved into position below the forming die and then be raised so as to present the yielding or resilient surface of die 21 within the space beneath the stratum of fibrous material. As the resilient die is forced upwardly it engages with the inner surface of the stratum and will compress it and further movement of the die will cause the resilient or elastic material to squeeze out in all directions so as to apply pressure over the entire inner surface of the stratum evenly or uniformly at all points, so that the lines of force or pressure will be at a normal to the surface of contact between the stratum and the die surface at the points of contact. At full compression, the shoulder 27 of the plate 22 will be seated against the shoulder 18 of the plate 3 as clearly shown in Fig. 3. As the stratum is compressed, the major portion of the water in the interstices of the fibrous stratum will be squeezed out through the apertures in the sheet 5 and the holes in the plate 3 and drawn away through the suction pipe 10.

After the stratum is sufficiently compressed to remove the major portion of the water, the suction in the box 6 may be changed now to pressure so that the compressed fluid will act against the stratum and remove it from the surface of the sheet 5. At the same time the pressing die is lowered and the stratum will be carried on it as shown in Fig. 4 of the drawings. The stratum will not adhere to the surface of the pressure die and may be readily removed for drying. If desired, it may be dried in any suitably heated space, and then replaced upon the pressing die for transference to the defining and finishing die shown in Fig. 5, or instead of taking the blank or stratum off of the pressing die (Fig. 4) it may remain there and be brought directly into engagement or contact with the defining or finishing die shown in Fig. 5. This die is preferably heated for that purpose. In either event, there is sufficient moisture left in the fibrous article to permit it to be compressed so that it will obtain the final desired definition of contour. Accordingly the pressure die with the article blank upon it (Fig. 4) is moved upwardly toward the defining and finishing die shown in Fig. 5 and as the die 21 is compressed it will be squeezed in different directions so as to apply pressure evenly at all points of the blank. As the blank is compressed against the inner surface of the plate 28, the outer surface of the blank will have imparted to it a detail or sharp definition of the surface of the plate 28. At the same time steam, vapors, and so forth, which may be formed may escape over the surface of the die 21, the surface of the latter, if necessary, being covered with a thin layer of fibrous material such as felt or the like to afford ways of escape of the steam or vapor. Ordinarily, there will not be sufficient amount to require any considerable means of release.

At this point of the operation, before the blank is compressed in the finishing die, if desired, the surface of the blank may be treated with any suitable material for effecting rigidity of the article and smoothness of the surface thereof. Also, the inner surface of the plate 28 of the finishing die may have been previously treated with beeswax or the like so that the blank will not have any tendency to adhere to it. After this operation is finished, the pressing die is lowered with the finished blank thereon. The latter may be readily removed and is then in finished condition.

When using the pressing die shown in Fig. 6, and when it has been moved in position to compress the wet blank in the forming die shown in Figs. 1, 2 and 3, a suction may be effective in the box 42 and a pressure effective in the box 6, so that the water in the interstices of the fibrous blank, may be drawn out through the ducts 35. Then when the blank is removed from the forming die, the pressing die with the blank thereon, may be applied directly to the hot finishing die without the intermediate step of drying in any heated atmosphere or the like. As the blank is pressed against the hot plates 28, the steam, vapors and gases which are produced by the heat of the plates, will be drawn out through the ducts 35 and thence through the pipe 45.

While I have in this case shown and described by way of illustration an article having the contour of a face or of a head of a person, it is to be understood that the invention is not limited to the shape or form illustrated but is adapted to produce any article of any form desired.

While I have herein disclosed an illustrative process and means of carrying out the process, it is to be understood that the invention is not limited thereto but may comprehend other process steps, constructions, arrangements of parts, details and features without departing from the spirit of the invention.

Having thus disclosed the invention, I claim:

1. In a process of producing articles of accreted fibrous material and with a defined surface contour, the steps of accreting and integrating a stratum of fibrous material from a bath of suspended fibres in a suspending medium and upon the contoured surface of a porous former, removing a portion of the fluid contained in said stratum after accretion and integration thereof so as to leave a sufficient amount of moisture in said stratum for the drying and finishing step of the process, compressing said stratum between the members of a die which are respectively provided with preformed surface contours complemental to the surface contours of said stratum, said compressing being effected in a resilient manner by reason of one of said members being formed of resilient material whereby the pressure against said stratum because of the resilient nature of the resilient member is so distributed in different directions as to be normal to the defined surface of contact between said members at the points of contact, and applying heat to said stratum to dry the stratum with a defined surface contour complemental to the defined surface contour of the other of said members of said die.

2. In a process of producing articles of accreted fibrous material and with a defined surface contour, the steps of accreting a stratum of fibrous material from a bath of suspended fibers and upon the contoured surface of a porous former, compressing said stratum between two members respectively provided with surfaces having complemental preformed contours which are also complemental to the surface contour applied to the stratum by said former, to substantially extrude the water from the stratum, one of said members being formed of resilient material, whereby the pressure against the stratum, because of the resilient nature of said last mentioned member, is so distributed in different directions as to be normal to the defined surface of contact between said member and said stratum at the complemental areas of contact, drying said stratum to the point of leaving sufficient moisture therein for a defined contoured surface effect, applying to said stratum a heated die having a defined surface contour complemental to the contoured surface of the stratum, and so applying the complemental preformed surface of said resilient member to said stratum as to compress the stratum against said die whereby the pressure of said resilient member is so distributed in different directions as to be normal to the defined surface of contact between said heated die and said stratum at the complemental areas of contact.

3. In a process of producing articles of accreted fibrous material and with a defined surface contour, the steps of accreting a stratum of fibrous material from a bath of suspended fibers and upon a contoured surface of a porous former, compressing said stratum between surfaces having preformed contours complemental to the surface contour applied to the stratum by the surface of said former to substantially extrude the water therefrom, drying said stratum to the point of leaving sufficient moisture therein for a defined contoured surface effect, applying to said stratum a heated die having a defined surface complemental to the contoured surface of said stratum, and so applying a complemental preformed surface of a resilient member having draining elements to said stratum as to compress the stratum against said die, whereby the pressure of said stratum, because of the resilient nature of said member, is so distributed in different directions as to be normal to the surface of contact between said die and said stratum at the complemental areas of contact, and steam, vapors and moisture are conducted directly away from said stratum.

4. In a process of producing articles of accreted fibrous material with a defined surface contour, the steps of accreting a stratum of fibrous material from a bath of suspended fibers and upon a contoured surface of a porous former, transferring the accreted stratum to a finishing die having a surface complemental to the contoured surface of said stratum, drying and finishing said stratum in said finishing die by applying heat to the contoured surface of the finishing die, and so applying a complemental preformed surface of a resilient member having drainage elements to said stratum in direct contact with surfaces of said stratum as to compress the stratum against the die whereby the pressure is so distributed in different directions as to be normal to the surface of contact between the die and the stratum at the points of contact, and for conducting away steam, vapors and moisture directly from said stratum.

5. In a device for producing articles of accreted material, a pressing die of resilient material having a preformed surface of normally constant design, said die having means for conducting fluid away from the surface areas of said accreted material which are engaged by the die while pressing the accreted material.

6. In a device for producing articles of accreted material, a pressing die consisting of a body of resilient material having a preformed surface of normally constant design.

7. In a device for producing articles of accreted material, a pressing die consisting of a body of resilient material having a preformed surface of normally constant design and having means provided with passages by which fluids are conducted away from the surface areas of the accreted material which are engaged by the die while pressing said material.

8. In a device for producing articles of accreted material, a pressing die consisting of a solid body of resilient material having a preformed surface of normally constant design, and having draining elements extended therethrough for conducting away fluid from the accreted material while being pressed by said die, said draining elements having their inlet ends in the preformed surface of said die.

JESSE B. HAWLEY.